United States Patent Office 3,271,190
Patented Sept. 6, 1966

3,271,190
ANTI-BLOCKING COMPOSITIONS AND SHEET
MATERIAL TREATED THEREWITH
Gale F. Nadeau and Crayton B. Thompson, Rochester,
N.Y., assignors to Eastman Kodak Company, Rochester, N.Y., a corporation of New Jersey
No Drawing. Filed Aug. 6, 1962, Ser. No. 214,833
10 Claims. (Cl. 117—138.8)

This invention relates to anti-blocking compositions. More particularly, this invention relates to anti-blocking compositions for polyester sheeting and to polyester sheeting treated therewith.

Polyester sheeting and particularly polyethylene terephthalate sheeting possesses the property of blocking. Blocking is defined in the art as an undesired adhesion between touching layers of a material such as occurs under moderate pressure during storage and/or use.

Thus, for example, it is usually difficult to separate a stack consisting of a plurality of layers of polyester sheeting owing to this undesirable property of blocking. Furthermore, polyester sheeting is often supplied in the form of a roll and this property of blocking presents a problem in that it is difficult to unwind the roll in a substantially uniform manner. This problem is of particular concern to those processors who desire to slit the roll into tape on high-speed tape slitting apparatus.

An object of this invention is an anti-blocking composition for use in treating polyester sheeting.

Another object of this invention is polyester sheeting possessing anti-blocking properties.

A further object of this invention is polyethylene terephthalate sheeting having a coating on at least one surface thereof of the novel anti-blocking composition of this invention.

In accordance with this invention there is provided a novel anti-blocking composition for use in treating or coating polyester sheeting. Polyester sheeting carrying on at least one surface thereof the anti-blocking composition of this invention has substantially reduced tendency toward blocking. Furthermore, the anti-blocking composition, after application to a surface of polyester sheeting, is highly adherent thereto and is not easily and readily removed therefrom during storage and/or use.

The anti-blocking composition of this invention is comprised of (1) an anionic surface-active agent and (2) an adhesion promoter. The adhesion promoter causes the surface-active agent to wet to a greater degree the surface of the polyester sheeting to which the composition is applied and further, provides a strong bond between the applied anti-blocking composition and the surface.

In preparing the anti-blocking composition of this invention there is employed 1 to 10 parts by weight of adhesion promoter for each one part by weight of surface active agent. The composition is preferably applied as a water solution or as a water dispersion thereof depending on the water solubility of the components employed. The amount of water employed is sufficient to provide a solution or dispersion that can be easily and readily applied to the surface to be coated. The amount of water employed is well within the skill of those versed in the art. While water is the preferred vehicle or carrier for the anti-blocking composition of this invention, other vehicles or carriers, such as liquid inert organic compounds having a relatively low boiling point can be employed if desired. After application, the treated sheet material is dried to remove therefrom substantially all water. Heat can be applied to hasten water removal, if desired.

Suitable adhesion promoters (2) include, for example, resorcinol, orcinol, catechol, pyrogallol, 1-naphthol, 2,4-dinitrophenol, 2,4,6-trinitrophenol, 4-chlororesorcinol, 2,4-dihydroxytoluene, 1,3-naphthalenediol, 1,6-naphthalenediol, acrylic acid, sodium salt of 1-naphthol-4-sulfonic acid, benzyl alcohol, trichloroacetic acid, o-hydroxybenzotrifluoride, m-hydroxybenzotrifluoride, o-fluorophenol, m-fluorophenol, p-fluorophenol, chloral hydrate, and o-cresol. Mixtures of two or more of the above adhesion promoters can be employed if desired. Of the above-enumerated adhesion promoters, resorcinol is preferred for use in carrying out this invention.

Surface active agents of the anionic type are well known in the art. Of particular use in carrying out this invention are the surface-active agents of the anionic type that are selected from the group consisting of a sodium salt of sulfated fatty alcohols, a sodium salt of an alkyl aryl sulfonate, and mixtures thereof.

Fatty alohols are usually recognized in the art as those having or containing from about 8 to 20 carbon atoms.

Sodium salts of fatty alcohol sulfates are well known anionic type surface active agents. Specific examples of these surface active agents include sodium octyl alcohol sulfate, sodium hexadecenyl sulfate, sodium lauryl sulfate (available commercially under the proprietary designation Duponol PC), mixed fatty alcohol sodium sulfate (available commercially under the proprietary designation Duponol D). Other sodium salts of fatty alcohols include the sodium sulfate derivative of 2-ethyl-1-hexanol (available commercially under the proprietary designation Tergitol 08); the sodium sulfate derivative of 7-ethyl-2-methyl, 4-undecanol (available commercially under the proprietary designation Tergitol 4); the sodium sulfate derivative of 3,9-diethyl tridecanol-6 (available commercially under the proprietary designation Tergitol 7). A specific example of a sodium fatty alcohol sulfonate that can be employed in this invention is sodium 2-ethylhexene sulfonate (available commercially under the proprietary designation Tergitol EH).

Sodium salts of alkyl aryl sulfonates are also well known surface active agents of the anionic type. Specific examples of these surface active agents include isopropyl naphthalene sodium sulfonate, dodecyl benzene sodium sulfonate (available commercially under the proprietary designation Padasol), decyl benzene sodium sulfonate, dibutyl naphthalene sodium sulfonate, monoamyl naphthalene sodium sulfonate, diamyl naphthalene sodium, sulfonate, and keryl benzene sodium sulfonate.

The following examples are illustrative of this invention. All parts are by weight unless otherwise indicated.

*Example I*

A coating composition, in an aqueous vehicle, is prepared by thoroughly admixing 2 parts of resorcinol, 0.2 part of sodium hexadecenyl sulfate, and 97.8 parts of distilled water. This composition is applied by roll-coating application to the surfaces of several sheets of previously untreated biaxially oriented polyethylene terephthalate film having a thickness of about 5 mils. After drying the treated sheets are stacked one upon the other and stored. The individual sheets of treated polyethylene terephthalate film can be easily and readily separated one from the other when required for use without any objectionable blocking occurring. Other polyethylene terephthalate sheet material treated in accordance with this example is convolutely wound upon a mandrel and stored. When required for use, the roll of treated polyethylene terephthalate film can be easily and readily unwound therefrom and processed, such, for example, as by passing the treated sheet material through a tape slitting machine, and no objectionable blocking between the adjacent layers occurs.

*Example II*

A composition for use in treating previously untreated biaxially oriented polyethylene terephthalate film is prepared by thoroughly admixing 2 parts of resorcinol and 1 part of sodium dodecyl benzene sulfonate with about 97 parts of distilled water to provide a coatable composition. This composition is applied by roll-coating procedure on a surface of a sheet of polyethylene terephthalate film having a thickness of about 5 mils and dried whereby substantially all the water is removed from the applied coating. The polyethylene terephthalate film with the applied slip-coating is subsequently wound on a mandrel to provide a roll thereof and stored. When required for use, the polyethylene terephthalate film can be easily and readily unwound from the roll without any evidence of objectionable blocking of the adjacent layers.

*Example III*

A composition for use in treating previously untreated biaxially oriented polyethylene terephthalate film is prepared by thoroughly admixing 2 parts of resorcinol and 1 part of sodium lauryl sulfate with about 97 parts of distilled water to provide a coatable composition. This composition is applied by roll-coating procedure on a surface of a sheet of polyethylene terephthalate film having a thickness of about 5 mils and dried whereby substantially all the water is removed from the applied coating. The polyethylene terephthalate film with the applied slip-coating is subsequently wound on a mandrel to provide a roll thereof and stored. When required for use, the polyethylene terephthalate film can be easily and readily unwound from the roll without any evidence of objectionable blocking of the adjacent layers.

Any of the above enumerated adhesion promoters can be employed in place of the resorcinol of the above examples with satisfactory results. Other anionic surface active agents can be employed for those of the above examples also with equally satisfactory results.

While the composition of this invention is adapted particularly for the treatment of film prepared from polyethylene terephthalate, it is to be understood that other polyesters can be similarly treated. Other well known polyesters in sheet or film form can be treated with the composition of this invention whereby the treated polyester film is protected against objectionable blocking. Thus, sheet material prepared from high molecular weight polyesters derived by condensing a dihydric alcohol with a dibasic saturated fatty carboxylic acid or derivative thereof can be treated in accordance with this invention. As dihydric alcohols there can be employed any glycol wherein the hydroxyl groups are on the terminal carbon atoms and contain from 2 to 12 carbon atoms. Specific examples of such glycols include ethylene glycol, propylene glycol, trimethylene glycol, hexamethylene, glycol, decamethylene glycol, dodecamethylene glycol, 1,4-cyclohexanedimethanol, and the like. Suitable diabasic acids are those containing from 2 to 6 carbon atoms, such, for example, as adipic acid, sebacic acid, decanedioic acid, hexadecanedioic acid, phthalic acid, isophthalic acid, terephthalic acid, and mixtures thereof. The alkyl esters of the above-enumerated acids can also be employed satisfactorily in the preparation of polyesters. Other suitable dihydric alcohols and diabasic acids for use in preparing polyesters that can be subsequently formed into film or sheet material are described in J. W. Wellman Patent 2,720,503, dated October 11, 1955.

While the above description of this invention has been directed specifically to the treatment of sheeting, it is to be understood that strands, fabrics, and the like prepared from polyesters can be similarly treated. Furthermore other resins in the form of sheet material can be treated with the anti-blocking composition of this invention to improve substantially the anti-blocking properties thereof. Examples of other resins include Saran, polyethylene, polystyrene, polypropylene polymerized methyl methacrylate, and nylon.

The amount of anti-blocking composition applied is sufficient to provide the desired anti-blocking properties to the sheeting treated therewith. The amount required is well within the skill of those versed in the art having before them the benefit of the teachings and the examples of this invention. It has been determined that when the amount of applied anti-blocking composition is within the range of 0.015 gram to 0.050 gram per each square foot of surface coated therewith, highly satisfactory results are obtained.

Polyethylene terephthalate film treated in accordance with this invention and carrying on at least one surface thereof about 0.025 gram of anti-blocking composition per each square foot of film surface can be employed as processing machine leader for use in processing color film products.

The applied anti-blocking composition adheres so well to the polyethylene terephthalate film that it has no adverse effect on the critical processing baths required for processing color film products.

The anti-blocking composition of this invention can be applied to one or both sides of the sheet material. Application can be made by spraying, brushing, dip coating, roll-application, bead application and the like.

It is to be understood that the above description and examples are illustrative of this invention and not in limitation thereof.

We claim:
1. As an article of manufacture a polyester sheet having applied to at least one surface thereof a composition comprising:
   (A) an anionic surface active agent and
   (B) from 1 part to 10 parts by weight for each part by weight of (A) of a compound selected from the group consisting of resorcinol, orcinol, catechol, pyrogallol, 1-naphthol, 2,4-dinitrophenol, 2,4,6-trinitrophenol, 4-chlororesorcinol, 2,4-dihydroxytolulene, 1,3-naphthalenediol, 1,6-naphthalenediol, acrylic acid, sodium salt of 1-naphthol-4-sulfonic acid, benzyl alcohol, trichloroacetic acid, o-hydroxybenzotrifluoride, m-hydroxybenzotrifluoride, o-fluorophenol, m-fluorophenol, p-fluorophenol, chloral hydrate, o-cresol, and mixtures of two or more.

2. As an article of manufacture a polyester sheet having applied to at least one surface thereof a composition comprising
   (A) an anionic surface active agent selected from the group consisting of a sodium salt of sulfated fatty alcohols, a sodium salt of an alkyl aryl sulfonate, and mixtures thereof and
   (B) from 1 part to 10 parts by weight for each part by weight of (A) of resorcinol.

3. As an article of manufacture a polyester sheet having applied to at least one surface thereof a composition comprising
   (A) sodium hexadecenyl sulfate and
   (B) from 1 part to 10 parts by weight for each one part by weight of (A) of resorcinol.

4. As an article of manufacture a polyester sheet having applied to at least one surface thereof a composition comprising
   (A) sodium dodecyl benzene sulfonate and
   (B) from 1 part to 10 parts by weight for each one part by weight of (A) of resorcinol.

5. As an article of manufacture a polyester sheet having applied to at least one surface thereof a composition comprising
   (A) sodium lauryl sulfate and
   (B) from 1 part to 10 parts by weight for each one part by weight of (A) of resorcinol.

6. The article as set forth in claim 1 wherein the polyester is polyethylene terephthalate.

7. The article as set forth in claim 2 wherein the polyester is polyethylene terephthalate.

8. The article as set forth in claim 3 wherein the polyester is polyethylene terephthalate.

9. The article as set forth in claim 4 wherein the polyester is polyethylene terephthalate.

10. The article as set forth in claim 5 wherein the polyester is polyethylene terephthalate.

References Cited by the Examiner

UNITED STATES PATENTS

| | | | |
|---|---|---|---|
| 2,885,295 | 5/1959 | McCord | 106—2 |
| 3,002,840 | 10/1961 | Kern et al. | 106—2 |
| 3,019,269 | 1/1962 | Glou | 260—621 |

OTHER REFERENCES

Rose, A. et al.: The Condensed Chemical Dictionary, Reinhold Corp., 1961, 6th edition, page 980 relied on.

ALEXANDER H. BRODMERKEL, *Primary Examiner.*

J. CARSON, L. HAYES, *Assistant Examiners.*